United States Patent [19]

Honeycutt, Jr.

[11] Patent Number: 4,784,326
[45] Date of Patent: Nov. 15, 1988

[54] CONVERGENT FLAP BEARING WITH INTEGRAL HOLD-DOWN DEVICE

[75] Inventor: Fred L. Honeycutt, Jr., Palm Beach Gardens, Fla.

[73] Assignee: United Technologies Corporation, Hartford, Conn.

[21] Appl. No.: 77,262

[22] Filed: Jul. 24, 1987

[51] Int. Cl.⁴ .......................... B64C 15/00; B64C 9/38
[52] U.S. Cl. .................................. 239/265.39; 244/216
[58] Field of Search ...................... 239/265.19, 265.33, 239/265.37, 265.39; 60/271; 384/25, 58; 244/216

[56] References Cited

U.S. PATENT DOCUMENTS 4,456,178 6/1984 Jones et al. ...................... 239/265.39
4,552,309 11/1985 Szuminski et al. .............. 239/265.19

*Primary Examiner*—Andres Kashnikow
*Assistant Examiner*—Karen B. Merritt
*Attorney, Agent, or Firm*—Robert C. Walker

[57] ABSTRACT

An exhaust nozzle of the type utilized with high performance supersonic aircraft is disclosed. The exhaust nozzle is variable between convergent and convergent-/divergent geometries, as well as in aperture size. A bearing guiding segments of the nozzle is held within a roller track by an integral hold-down bracket.

1 Claim, 3 Drawing Sheets

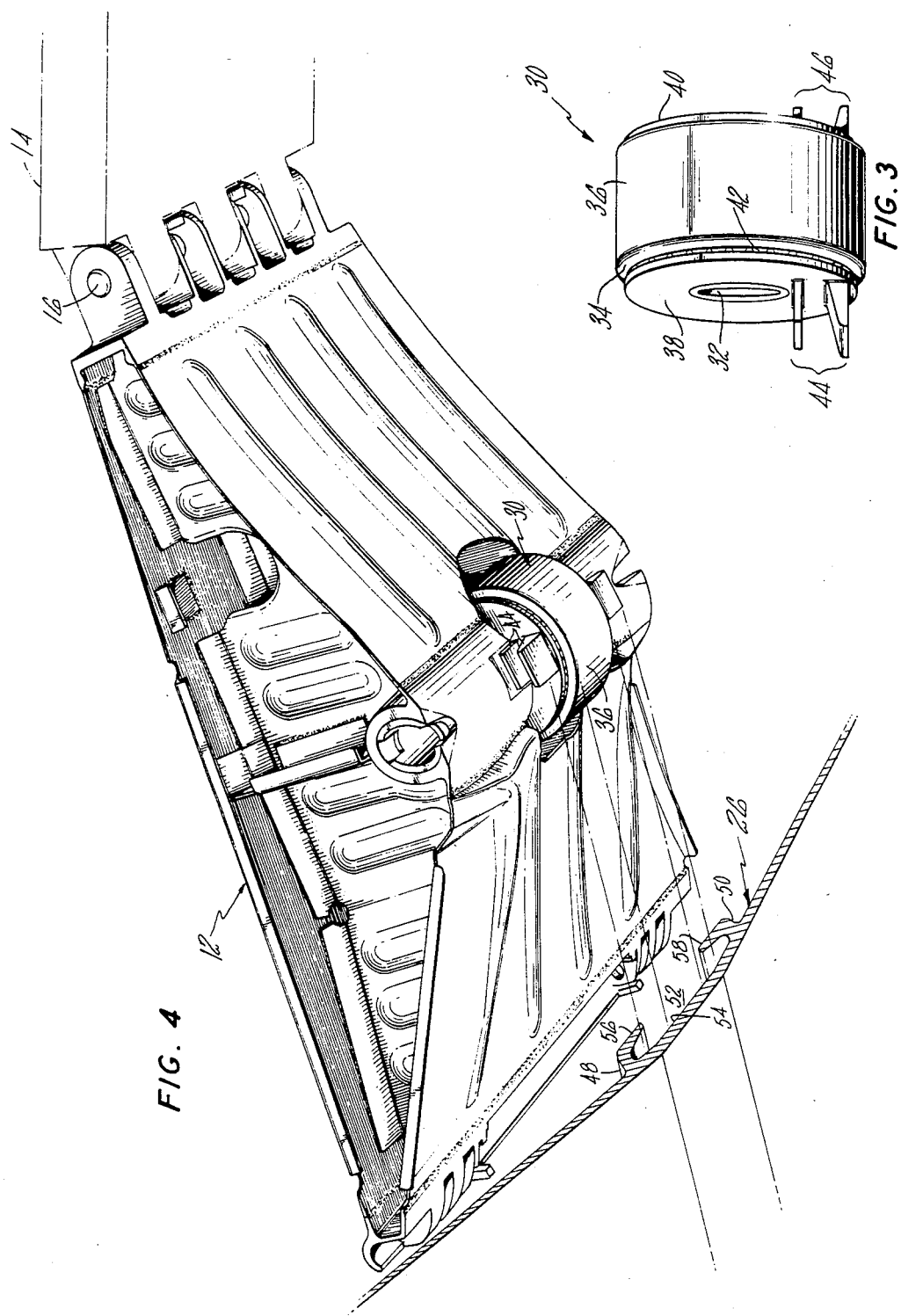

CONVERGENT FLAP BEARING WITH INTEGRAL HOLD-DOWN DEVICE

DESCRIPTION

TECHNICAL FIELD

This invention relates to gas turbine engines, and more particularly to engines having variable geometry exhaust nozzles.

DESCRIPTION OF THE PRIOR ART

Engines of the type to which the present concepts apply are utilized to power aircraft capable of both subsonic and supersonic flight. The engines have a core section formed of compression stages for raising the pressure of input air entering the engine, a combustor for mixing the input air with fuel and burning the mixture to create a high energy gas stream, turbine stages for extracting power from the high energy gases to run the compression stages, and an after burner for again raising the energy level of the gas stream prior to discharge from the engine.

Gases from the afterburner are discharged from the engine through a circular aperture at the downstream end of the exhaust nozzle. The exhaust nozzle inlet is of a variable geometry type and is typically formed of a plurality of circumferentially segments which are deployable to vary the diameter of the aperture through which the discharged gases pass. Further, the geometry of the exhaust nozzle is variable upstream of the aperture as well. For anticipated exhaust gas velocities of less than Mach 1.0 the nozzle is deployed to a convergent geometry for maximizing the exit gas velocity at a given nozzle throat area. For exhaust gas velocities of greater than Mach 1.0 the nozzle is deployed to a convergent/divergent geometry such that the exhaust gases are further accelerated to supersonic velocities downstream of the nozzle throat.

Mechanisms necessary to accomplish the geometry and the aperture throat area changes are rather complex. Additionally, the mechanisms must be reliable in a hostile, high temperature environment and durable under constant vibration. Nozzle settings vary frequently as engine throttle conditions change. Smooth operation through such transitions is required.

One predecessor mechanism to that of the present invention is illustrated in FIG. 2 (prior art). Shown in FIG. 2 is one segment of an exhaust nozzle in which a roller bearing A and a clip B for holding the bearing in a corresponding roller track are independently located.

Notwithstanding the availability of mechanisms such as that shown in FIG. 2, scientists and engineers in the gas turbine engine field have continued to search for mechanisms having greater durability and ease of operation in the transitions between convergent and convergent/divergent operating modes.

DISCLOSURE OF THE INVENTION

According to the present invention a segment of a convergent/divergent exhaust nozzle having convergent and divergent flaps is deployable along a roller track and is held in closely spaced relationships thereto by a bearing having an outer race resting on the track and an inner race having a hold-down bracket which engages the track.

An important feature of the invention is the location of the hold-down bracket relative to the outer race of the bearing. The use of a bearing having an integral hold-down bracket positions the exhaust nozzle segment securely along the track and permits smooth repositioning of the segment along the track without binding. Attaching the hold-down bracket directly to the bearing or forming the hold-down bracket as a portion of the side plate of the bearing provides good durability, even under conditions of substantial vibration.

The foregoing, and other features and advantages of the present invention will become more apparent from the following description and accompanying drawings.

BRIEF DESCRIPTION OF THE DRAWING

FIG. 3 is a perspective view of a bearing having an integral hold-down device constructed in accordance with the present invention; and FIG. 4 is a perspective view of a convergent flap of an exhaust nozzle segment constructed in accordance with the present invention.

BEST MODE FOR CARRYING OUT THE INVENTION

Figure 1:
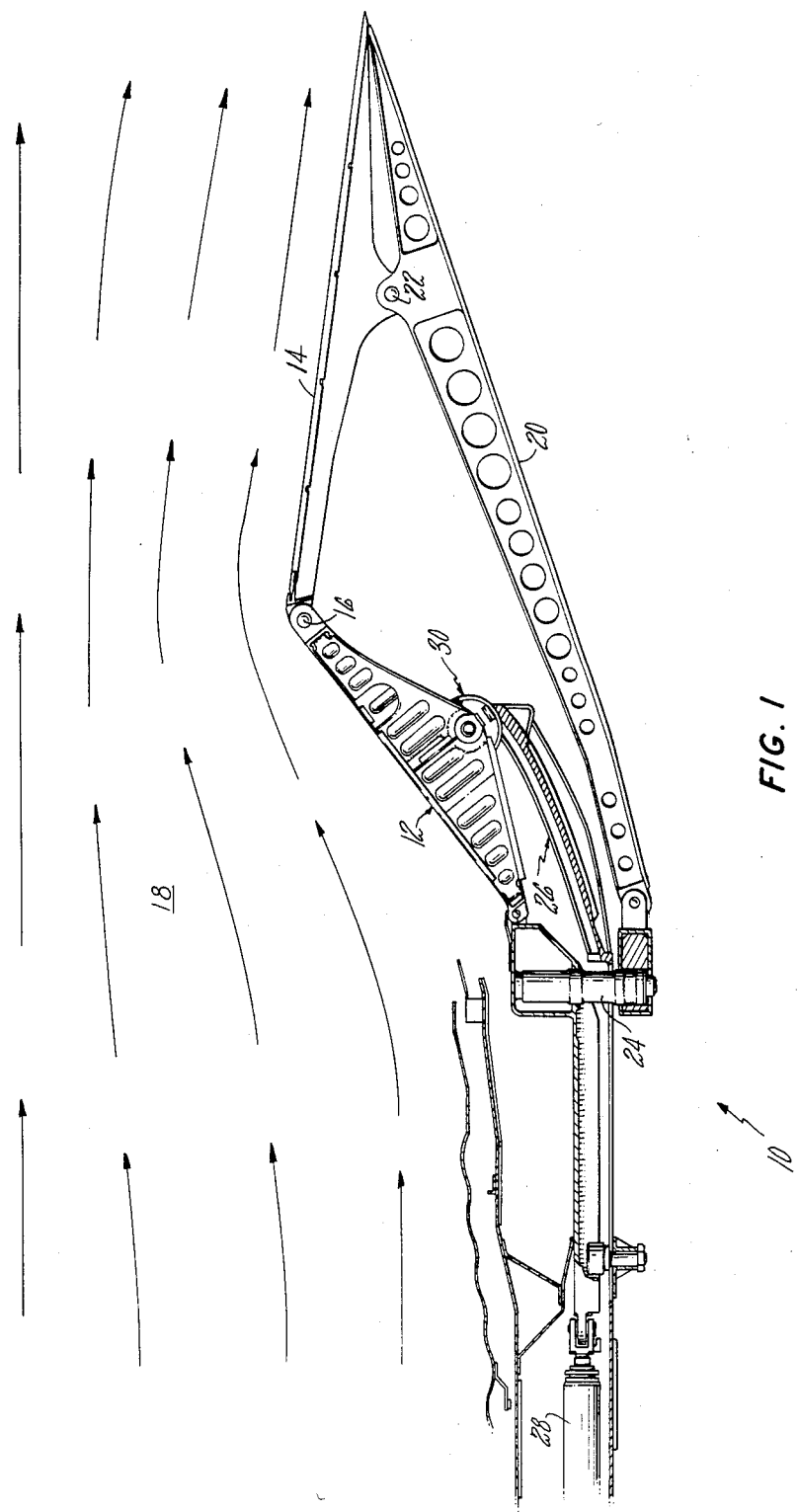
FIG. 1 is a partial cross section view showing components of the exhaust nozzle of a gas turbine engine.
Figure 2:
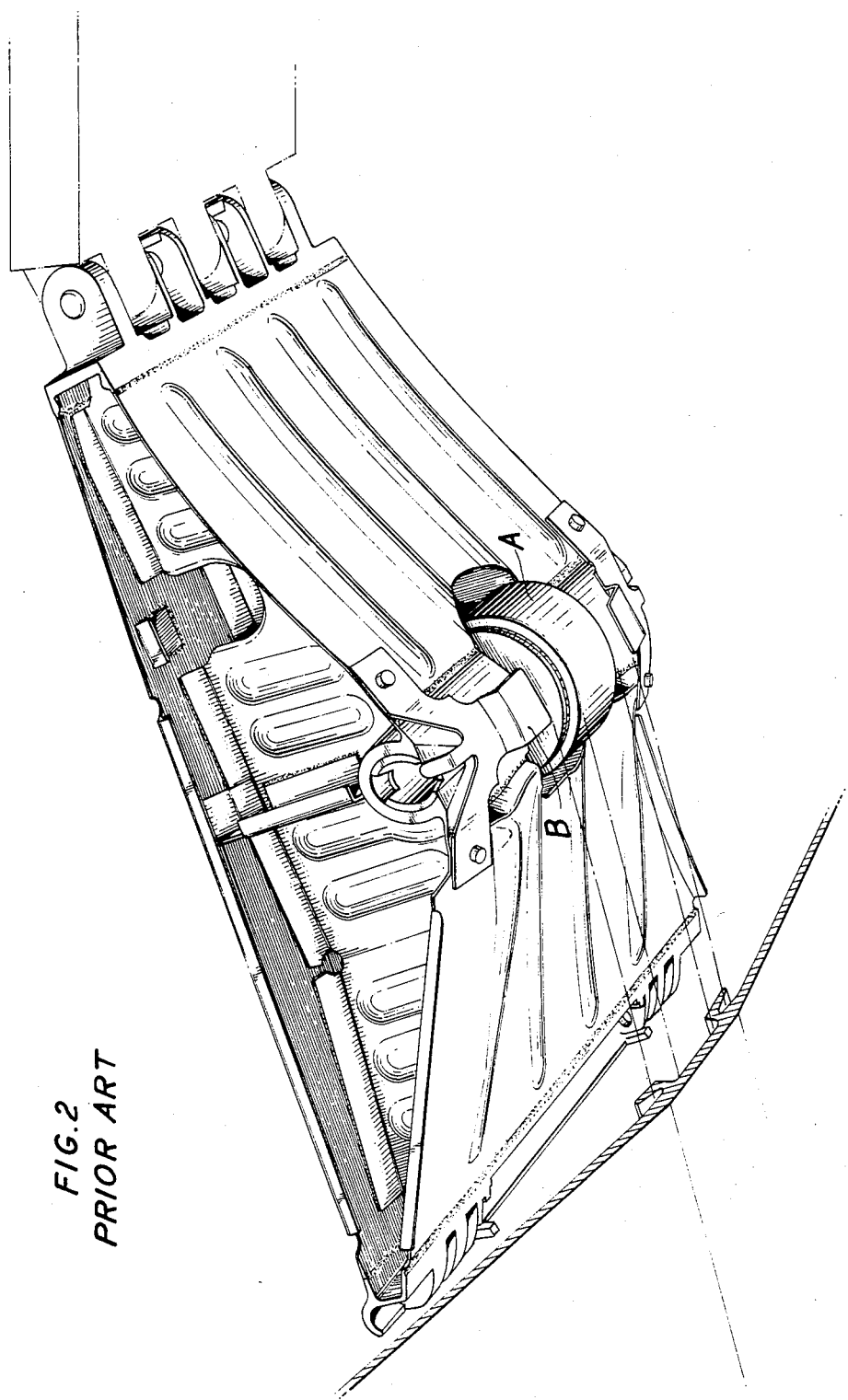
FIG. 2 (prior art) is a perspective view of a convergent flap of such an exhaust nozzle employed prior to the convergent flap of the present invention.

A portion of the exhaust nozzle 10 of a gas turbine engine is shown in FIG. 1. The nozzle is of the convergent/divergent type utilized with high performance aircraft. In the position shown, the exhaust nozzle is in the convergent/divergent mode adapted to supersonic flow.

The nozzle is formed of a plurality of circumferentially adjacent convergent flaps, as represented by the single convergent flap 12, and a plurality of circumferentially adjacent divergent flaps, as represented by the single divergent flap 14. The convergent and divergent flaps are joined by a pin 16 to form the inner wall of a flow path 18 for high temperature gases being discharged from the engine on which such a nozzle is installed. A plurality of external segments, as represented by the single segment 20, are each joined at one end by a pin 22 to the divergent flap 14 and through intermediate structure 24 to the upstream end of the convergent flap 12 to form a triangularly shaped assemblage.

A roller track 26 which is fixedly positioned with respect to stationary structure of the engine on which the nozzle is installed is located radially outwardly of the convergent flap 12. An actuator 28 is attached at one end to the intermediate structure 24 and is capable of drawing the triangularly shaped assemblage of convergent flap 12, divergent flap 14 and external segments 20 forwardly along the axis of the engine.

The convergent flap 12 has a roller bearing 30 along its mid-point. The bearing rolls along the track 26 as the above assemblage is withdrawn. As can be seen from the location of the pins in Figure 1, the shape of the triangular assemblage becomes flattened as the roller progresses down the track to the point that a solely convergent nozzle is formed.

Those skilled in the art will recognize that the high temperature gases of the flowpath 18 produce a hostile environment in which the flap and roller mechanism must operate. A mechanism which permits smooth reliable operation along the track without causing the roller or flap structure to bind in the process is essential.

The components are subjected to constant vibration produced by aerodynamic loadings both internally and externally of the exhaust nozzle and by rotation of the engine rotor.

The apparatus of the present invention permits smooth and reliable operation even in the hostile environment to which the components are subjected. This is enabled by the use of a roller bearing as shown in FIG. 3. The roller bearing 30 has an inner race 32 and an outer race 34. The outer race has a cylindrical surface 36. The inner race has a pair of disk-shaped side plates 38 and 40 which are attached to and rotate with the inner race. Ball bearings 42 are disposed between the side plates and the outer race. Roller bearings (not shown) are disposed between the outer race and the inner race.

Each side plate 38 and 40 of the roller bearing 30 has a U-shaped hold-down bracket, 44 and 46 respectively, extending perpendicular to the corresponding side plate. The hold-down bracket may be a separate piece which is welded or brazed to the respective side plate, or may be integrally formed with the sideplate as shown.

In FIG. 4, one convergent flap 12 of the present invention is shown in proximate position to the roller track 26 which guides the flap. The roller track has a pair of upwardly extending side walls 48 and 50 forming a channel 52. The channel has a roller surface 54 at the base thereof. Tangs 56 and 58 extend perpendicularly from the side walls 48 and 50 respectively into the channel. As installed, the hold-down brackets 44 and 46 of the roller bearing engage the tangs 48 and 50 of the roller track 26.

The use of a bearing having integral hold-down brackets allows close tolerancing of both the rolling and holding features of the flap mechanism. The roller surface of the outer race of the bearing and the hold-down bracket are dimensioned from rigidly controlled bearing components. Excessive manufacturing tolerances and weld distortion inherent in prior mechanisms are avoided. Experiences have shown this feature to be highly successful in providing the smooth transition between variable geometry modes required of the mechanism.

It should be understood that the invention is not limited to the particular embodiments shown and described herein, but that various changes and modifications may be made without departing from the spirit and scope of this novel concept as defined by the following claims.

I claim:

1. For a gas turbine engine of the type having a variable geometry convergent/divergent exhaust nozzle formed of a plurality of circumferentially adjacent segments, the improvement comprising:

a roller track affixed to the stationary structure of the engine outwardly of each circumferentially adjacent nozzle segment and along which each such segment is deployable to vary the geometry of the convergent/divergent nozzle, the track having a channel formed of a pair of opposing side walls extending inwardly from a roller surface at the base of the channel toward the corresponding nozzle segment, and a pair of tangs, one each extending perpendicularly into the channel from said opposing side walls; and a bearing affixed to each nozzle segment and positioned so as to roll along the roller surface of the channel as the geometry of the exhaust nozzle is varied, wherein the bearing has an inner race fixedly attached to the nozzle segment, an outer race rotatable with respect to the inner race and disposed within said channel of the roller track, a pair of disk-shaped side plates attached to the inner race, independent of the outer race, and a bracket of essentially U-shaped geometry extending from each of the bearing side plates with the open side of the "U" facing a corresponding tang of the roller track so as to hold the outer race of the bearing in close proximity with the roller surface of the track as the bearing moves therealong.

* * * * *